United States Patent [19]

Young et al.

[11] 4,449,181

[45] May 15, 1984

[54] DATA PROCESSING SYSTEMS WITH EXPANDED ADDRESSING CAPABILITY

[75] Inventors: Arthur P. Young; Clive D. P. Gildersleeves; Brian W. Partridge, all of Chelmsford; Keith L. Ryder, Brentwood, all of England

[73] Assignee: The Marconi Company Limited, Chelmsford, England

[21] Appl. No.: 193,080

[22] Filed: Oct. 2, 1980

Related U.S. Application Data

[63] Continuation of Ser. No. 952,967, Oct. 20, 1978.

[30] Foreign Application Priority Data

Oct. 21, 1977 [GB] United Kingdom ............... 43908/77

[51] Int. Cl.³ ........................... G06F 1/00; G06F 9/20
[52] U.S. Cl. .................................................. 364/200
[58] Field of Search ....... 364/200 MS FILE, 900 MS FILE

[56] References Cited

U.S. PATENT DOCUMENTS

| | | | |
|---|---|---|---|
| 3,546,677 | 12/1970 | Barton et al. | 364/200 |
| 3,848,234 | 11/1974 | MacDonald | 364/200 |
| 3,854,126 | 12/1974 | Gray et al. | 364/200 |
| 3,909,798 | 9/1975 | Wallach et al. | 364/200 |
| 3,982,231 | 9/1976 | Bernstein et al. | 364/200 |
| 4,034,347 | 7/1977 | Probert, Jr. | 364/200 |
| 4,037,215 | 7/1977 | Birney et al. | 364/200 |
| 4,056,844 | 11/1977 | Izumi | 364/200 |
| 4,068,303 | 1/1978 | Morita | 364/200 |
| 4,181,937 | 1/1980 | Hattori et al. | 364/200 |
| 4,214,304 | 7/1980 | Shimizu et al. | 364/200 |
| 4,229,789 | 10/1980 | Morgan et al. | 364/200 |

*Primary Examiner*—Gareth D. Shaw
*Assistant Examiner*—Daniel K. Dorsey
*Attorney, Agent, or Firm*—Diller, Ramik & Wight

[57] ABSTRACT

The invention relates to memory-mapping and protection facilities in multi-processor data-handling systems. A feature of the invention relates to systems in which a plurality of processors, including both arithmetic processors and processors for the control of external data handling devices, communicate with each other and with a main store using a shared data-bus.

Addresses generated by the processors are split into a most significant part A and a least significant part B. The part A is used to address a table store which generates the most significant digits P of the main store address, with an indication Q of the type of access permitted (e.g. read only or read and write). The digits P and B serve to form the address of a main store location or a device control processor function, the digits Q being communicated with them over the data-bus and used to address in a controlled manner, main store locations and device control processor functions.

In the preferred implementation the table store holds a large number (e.g. 64) of tables and a table number store holds, for each processor the number of the table currently in use. This enables processors to be allocated tables rapidly and independently the table allocated being set to suit the task to be undertaken.

1 Claim, 3 Drawing Figures

DATA PROCESSING SYSTEMS WITH EXPANDED ADDRESSING CAPABILITY

This is a continuation, of application Ser. No. 952,967 filed Oct. 20, 1978.

BACKGROUND OF THE INVENTION

This invention relates to data processing systems and in particular to multi-processor data processing systems utilising a data-bus or highway in order to permit the processors in the system to communicate with each other and with memory stores within the system and with external devices.

One example of such a system is the Locus 16 data processing system. "Locus" is a Registered Trade Mark of the Marconi Company Limited.

Usually at least one of the processors in the system is capable of general purpose arithmetic and logical operations using a program stored within the system.

A problem which arises with such systems is that the processors commonly used are capable of generating only sixteen bits to form an addressing codeword giving access to requisite data stored in a particular part of a store and this limits the number of storage areas which may usefully be employed to 65,536($2^{16}$). For many purposes this is insufficient.

On the other hand, stores commonly have the facility to provide storage for of the order of 1,000,000 data items so as to be addressable by 20 bit words ($2^{20}$) 1,048,576.

One object of the present invention is to provide an improved multi-processor data processing system in which the above difficulty is reduced.

BRIEF SUMMARY OF THE INVENTION

According to this invention a multi-processor data processing system comprises a plurality of processors, a main store for data items required by said processors, a table store containing a plurality of tables of addressing codewords relating to different regions of said main store, each region containing a plurality of data storage areas for individual data items, means for signalling to said table store the identity of a processor requiring access to said main store whereby to select a predetermined table whereupon said table store addresses said main store to select those regions therein to which that selected table relates and means for addressing said main store with a part of a digital addressing word generated by said processor whereby to select a required data storage area or areas within said selected region or regions.

Said part of said digital addressing word generated by a processor may, in some cases, be the whole of that generated word but preferably the arrangement is such a first part, A digits in length, of the digital addressing word generated by a processor is utilised to select the appropriate codeword in said identified table within said table store, which appropriate entry defines a region of said main store, and a remaining part, B digits in length, of said digital addressing word is utilised to address said main store to select a storage area within said defined region.

Said table store may contain, for each of said plurality of processors, a table of addressing codewords relating to different regions of said main store, in which case according to a feature of this invention a multi-processor data processing system comprises a plurality of processors each capable of generating an addressing codeword of X bits, a main store for data items required by said processors and capable of being addressed by an addressing codeword of Y bits, a table store containing for each processor, a table of addressing codewords relating to different regions of said main store, each region containing a plurality of data storage areas for individual data items, means for signalling to said table store the identity of a processor requiring access thereto whereby the appropriate table within said table store is selected, means for addressing said selected table within said table store with a part, A digits in length, of the digital addressing word generated by said processor, whereby said table store addresses said main store with digital addressing word of Z bits to select one of said regions therein and means for addressing said main store with a remaining part, B digits in length, of the digital addressing word generated by said processor whereby to select a required data storage area within said selected region, and wherein Y is greater than X and Z is greater than A.

Preferably however said table store contains a plurality of tables of addressing codewords relating to different regions of said main store, each of which relates to particular data required from said main store and a further store is provided to relate individual ones of said processors to individual ones of said plurality of tables, said further store being arranged to address said table store to cause the selection of a particular table therein in dependence upon which of the processors is requiring access to said main store. Normally the number of tables stored in said table store is greater than the number of processors and the contents of said further store are variable whereby to enable the relating of different ones of said processors to different ones of said tables.

By data is to be understood any form of stored information including programs.

Said table store may also include stored codewords defining areas of said main store to which various of said processors should not have access, in which case said table store is arranged to address said main store not only with a digital addressing word to select one of the regions therein but also with a codeword defining when said addressing word relates to an area of said main store to which that processor which is addressing said table store should not have access, or should only have conditional access, e.g. "read only".

As will be appreciated, said main store and said table and further stores (but preferably not so far as the latter stores are concerned) may be constituted by storage distributed about the system. For example, normally each processor will itself contain registers or other forms of storage which may constitute part of said main store and/or part of said table and/or further stores.

In a practical example A=4 bits, B=12 bits, X=16 bits, Y=20 bits and Z=8 bits.

In a typical example also, twelve processors are provided.

Preferably all of said stores and said processors are interconnected by a data-bus or highway and, as known per se (see, for example, the Locus 16 system referenced above) a central control unit is provided to determine which one of said processors is given access to said data-bus at any one time.

Preferably said table store and, where provided, said further store, is accessible for changing any of the contents thereof to one and one only executive processor.

Said last mentioned processor may be one of said plurality of processors or an individual executive processor.

Each table stored in said table store may relate to data required by an individual one of said processors or to data required by each of a plurality of said processors.

In operation, some or all of said tables relating to data frequently required may be regarded as permanent or resident.

BRIEF DESCRIPTION OF THE DRAWING FIGURES

DETAILED DESCRIPTION OF THE INVENTION

Figure 1:
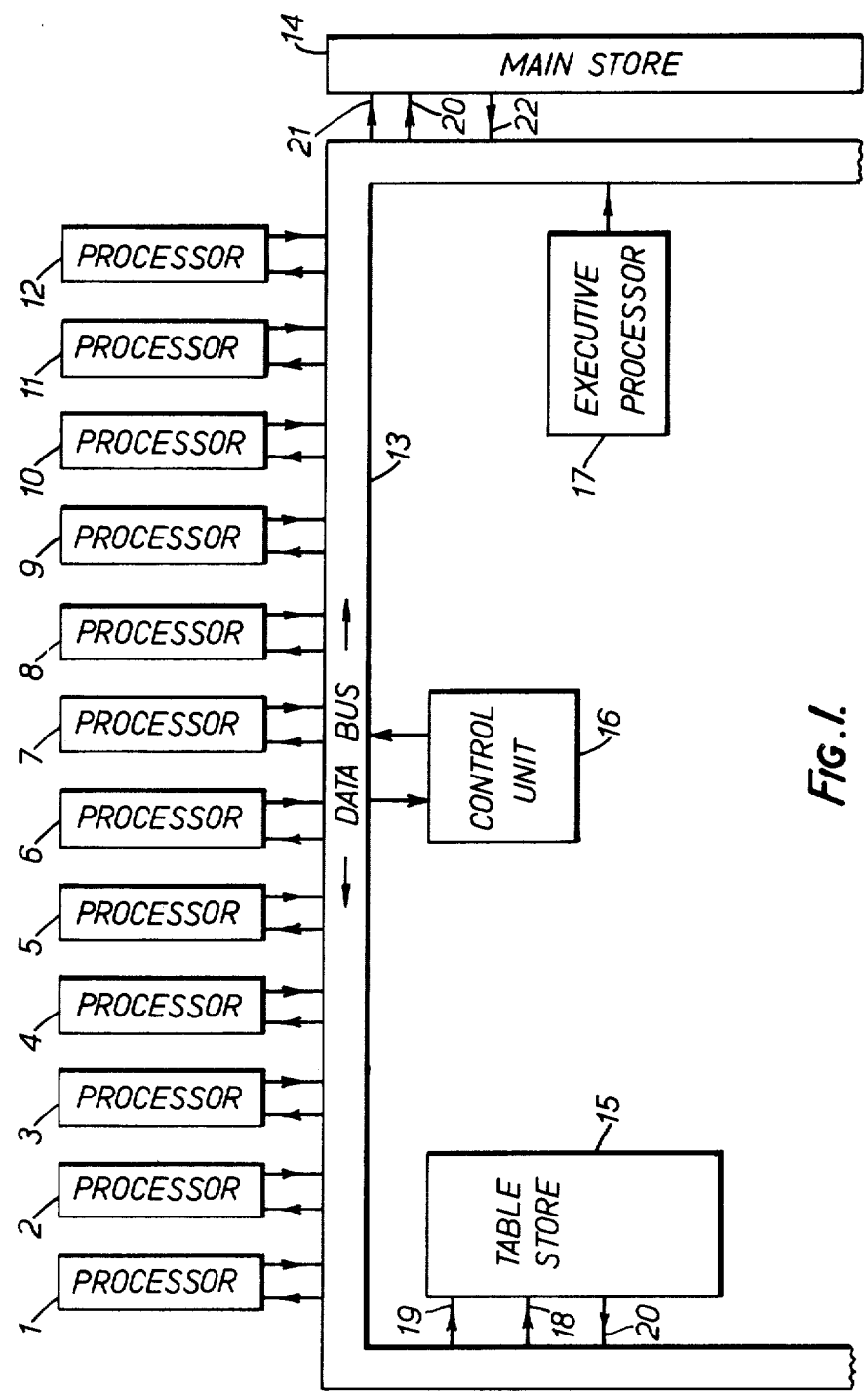
FIG. 1 is a block diagram illustrating the principles of this invention.
Figure 2:
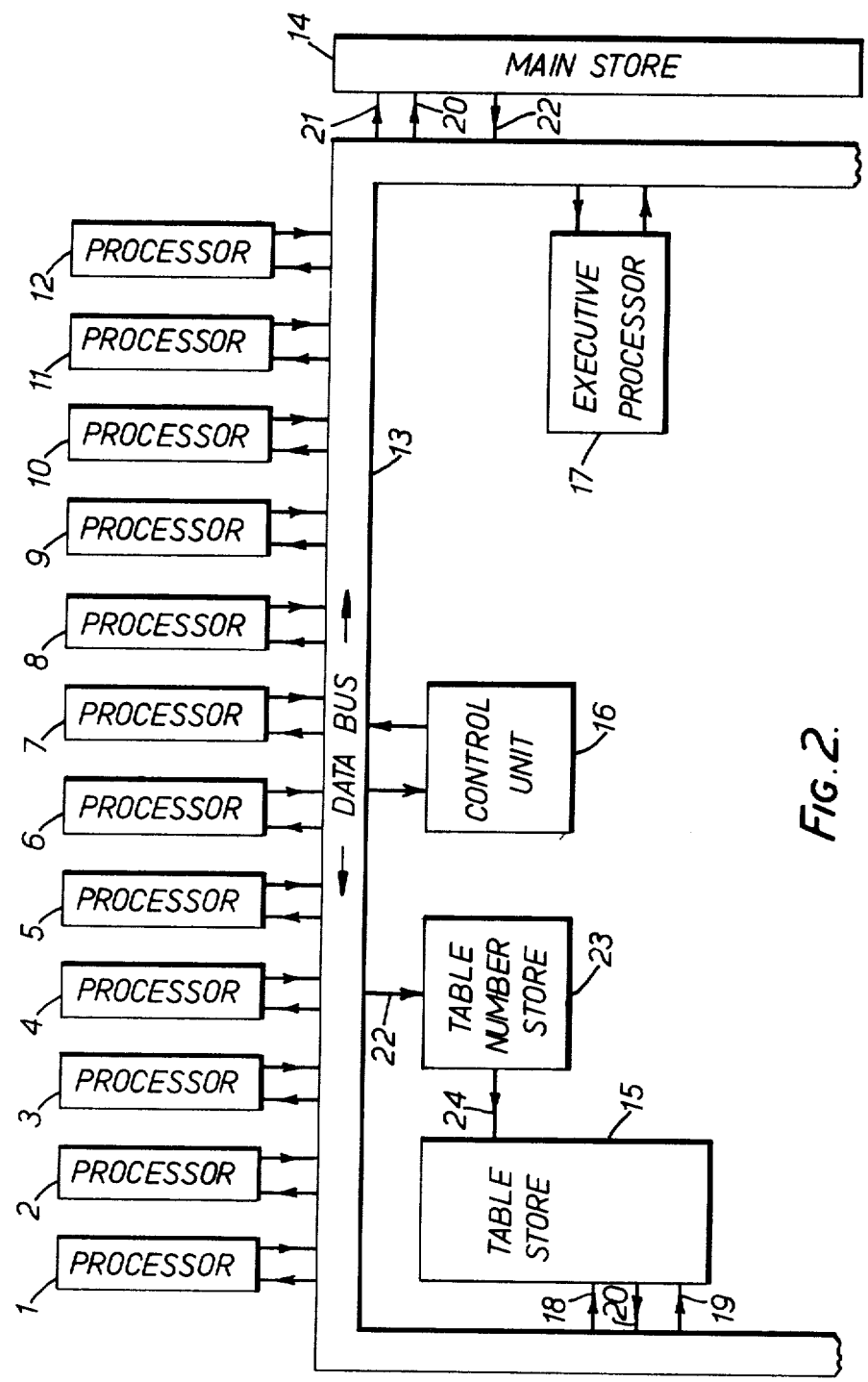
FIG. 2 is a block diagram similar to FIG. 1 but illustrating a modified form of table storage means.
Figure 3:
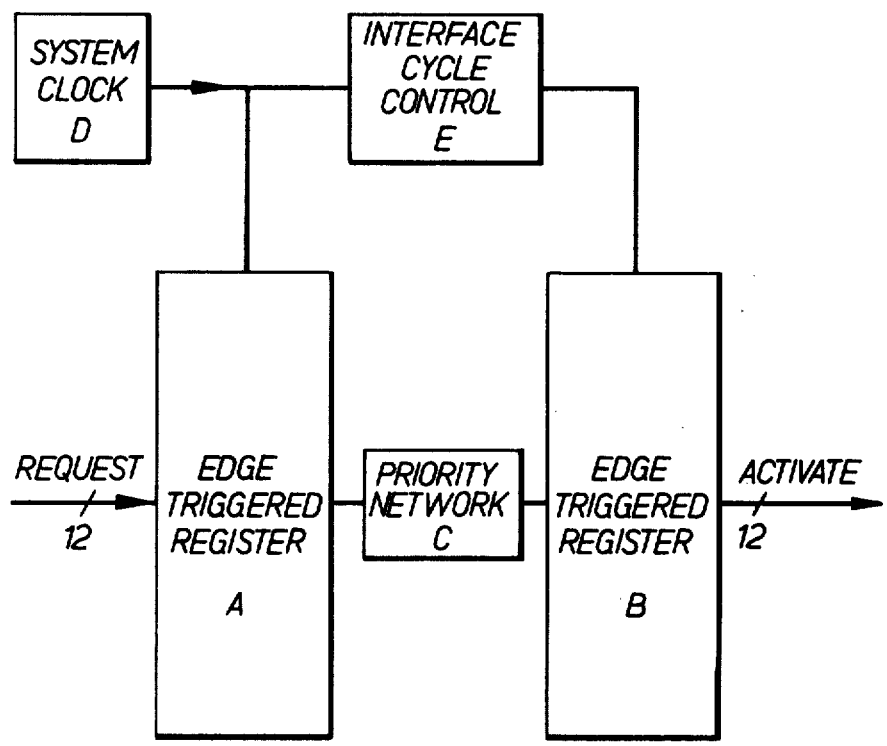
FIG. 3 is a block diagram illustrating the control unit.

The invention is further described with reference to FIGS. 1,2 and 3 of the accompanying drawings which are highly schematic block diagrams representing two examples of one data processing system in accordance with the present invention. In FIGS. 1 and 2 like references are used for like parts. FIG. 3 represents the control unit shown in FIGS. 1 and 2.

Referring to FIG. 1, twelve processors referenced 1 to 12 are connected to a data-bus 13. One of these processors, 1, receives information to be processed and feeds it in parallel digital form to the data-bus. Other processors, e.g. 2,3,4 and 5, perform mathematical calculations and logic functions. The processors produce outputs to communication systems e.g. to a visual display, to a disc storing device, to paper tape equipment and to a printer. Also connected to the data-bus 13 is a main store 14 a table store 15, a control unit 16 and an executive processor 17.

The data-bus 13 is controlled by control unit 16 so as to be capable of passing the following signals:

(a) Signals from the processors 1 to 12 showing which of these are currently awaiting use of the data-bus 13.

(b) Signals from the data-bus control unit 16 indicating which one of the processors 1 to 12 is to make use of the data-bus when this becomes free.

(c) A digital codeword generated by one of the processors 1 to 12 and defining the data item to which access is required by that processor.

(d) A signal defining the nature of the access required, e.g. "read" or "write" and (e) Signals defining the content of the data item to which access is required, these last mentioned signals being generated by the digital processor currently making use of the data-bus for "write" operations and being signals generated by the main store 14 or the table store 15 or that one of the digital processors 1 to 12 providing the data for "read" operations.

As known per se (see, for example, the Locus 16 system referenced above) the data-bus 13 is also provided to carry other types of information such as signals indicating when particular data items are available on the data-bus or when the transfer of particular sets of information is complete or signals relating to the functions of the executive processor 17.

Table store 15 contains twelve sets of tables each individual to a different one of the processors 1 to 12. Each stored table contains a set of addressing codewords relating to different regions of the main store 14. Each of the regions of the main store 14 contains a plurality of data storage areas for individual data items, which may be required by one or more of the processors 1 to 12, at different times.

Each digital processor 1 to 12 is capable of generating a sixteen bit addressing codeword. The main store 14 is provided to store of the order of 1,000,000 individual data items and is capable of being addressed by a 20 bit addressing codeword.

The connection of the table store to the databus 13 is such that as the control unit 16 provides access to the data-bus 13 for a particular one of the processors 1 to 12 so, by means of the connection represented at 18 that table in the table store 15 is selected which is appropriate to the particular one of the processors 1 to 12. The addressing 16 bit codeword generated by the particular one of processors 1 to 12 is divided into two parts, the first of which consists of the four most significant digits and the second of which consists of the remaining twelve least significant digits. The four most significant digits are applied to the table store 15 via the connection represented at 19 to address the selected relevant stored table which thereupon outputs an eight bit codeword which is applied via connection 20 to the main store 14 to select the region therein which is of interest. The least significant twelve digits of the addressing codeword generated by the selected one of the processors 1 to 12 is applied via the data-bus and connection 21 to the main store 14 where it is utilised to address the particular region identified in the main store 14 and thus select the data item at that time required by the processor. This is transmitted to the processor via connection 22 and the data-bus 13.

Thus whilst the digital processors are capable of generating sixteen bit addressing codewords only, the effective codeword utilised to address the main store is twenty bits in length and thus the total storage capability of the system is relatively increased. It will be noted that a particular codeword generated by one of the processors 1 to 12 may define the same address in the main store 14 as the identical codeword generated by another of the processors 1 to 12 or it may identify a totally different address as determined by the content of the relevant table in the table store 15.

Whilst in this example a separate executive processor 17 is provided to have exclusive control of the varying or changing of the tables stored in table store 15, one of the processors 1 to 12 may be designed as an executive processor.

In addition to the twelve sets of tables referred to above, table store 15 also includes storage further defining the permitted nature and extent of the access to the various data items stored in the main store 14. As well as one of the aforementioned addressing codewords being transmitted to address the main store 14, a codeword is also signalled from table store 15 to the main store 14 in order to constrain the response to the addressing of the main store 14 and thus limit the effects of errors in programs.

Referring to FIG. 2, again twelve processors referenced 1 to 12 are connected to a data-bus 13. Also connected to the data-bus 13 is a main store 14, a table store 15, a control unit 16 and a further or "table number" store 23.

Within table store 15 are stored sixty-four tables relating to data which will be required by the processors 1 to 12. The table store 15 is provided to be addressed via the connection 24 (in this case separate from the data-bus 13 in the interest of speed) by table number store 23. In table number store 23 is stored twelve table numbers each identifying a table within table store 15 which is to be selected when a particular one of the processors 1 to 12 wishing to access the main store 14 is selected. The table number store receives signal 22 which indicates the identity of the selected processor. The digital number received from the table number store 23 by the table store 15 to select the appropriate table therein is in six bit form, and again this selects a region of the main store 14. The addressing of the selected table in table store 15 by the most significant four digits. of the addressing codeword generated by the selected processor and the addressing of the selected region of the main store 14 by the least significant twelve digits is as described with reference to FIG. 1.

In effect, in both FIGS. 1 and 2, the tables stored in table store 15 may be considered to provide a plurality of sets of access routes to the different regions of the main store 14, a given set being selected in dependence upon the data required by a particular processor, in the case of FIG. 2, as identified by the table number entered into further "table number" store 23.

It will be noted that different processors may at different times access the same table stored in table store 15 and indeed if the number of different data items required is inconveniently great so that it is not practicable for every set of data items to have a corresponding table stored in table store 15, only those sets of data items which are common to more than one of the processors 1 to 12, or which are most commonly in use by one or other of the processors may have corresponding tables stored in the table store 15 in a permanent or resident fashion.

Tables relating to less frequently required sets of data items may be replaced in the table store 15 as required.

In addition to the twelve tables referred to in connection with FIG. 1 and the sixty-four tables referred to in connection with FIG. 2, table store 15 also includes storage further defining the permitted nature and extent of the access to the various data items stored in the main store 14. As well as one of the aforementioned addressing codewords being transmitted to address the main store 14, a codeword is also signalled from table store 15 to the main store 14 in order to constrain the response to the addressing of the main store 14 and thus limit the effects of errors in programs.

The data-bus is a printed circuit board carrying edge connectors, corresponding connecting pins of which are joined together by the printed circuit board in such a way as to enable high-speed signals to pass between circuits plugged into the various connectors. The printed circuit board includes an "earth plane" and other screening arrangements to prevent unwanted "cross-talk" between signal paths. Data-bus signal transmission and reception may use 26S10 or similar chips.

The control unit, processors and stores can be realised using integrated circuits and microprocessors. Designs of arithmetic and logic processors can conveniently use AMD 2901 circuits. Alternatively microprocessors such as the Texas Instruments 9900 or Intel 8086 could be used.

The control unit 16 controls the access of processors to the data-bus to which it is connected by twelve 'request' lines and twelve 'activate' lines. Referring to FIG. 3, the 'request' lines are connected in the control unit to an edge-triggered register A and indicate which of the twelve processors in the system are requesting use of the data-bus. A 'priority network' C generates a further twelve lines which are connected to a second 'edge-triggered' register B which generates twelve corresponding 'activate' lines.

On occasions when one or more of the twelve staticised 'request' signals entering the priority network C is active, one and only one of the twelve lines connecting it to the register B is active, the priority network serving to pass on the highest numbered request whilst suppressing all others. When the data-bus is available for use the edge-triggered register B is operated so that its outputs, the 12 'Activate' lines, correspond to the outputs of the 'priority' network. Consequently only one 'Activate' line becomes active the one connected to the highest numbered processor for which the corresponding 'Request' line was active. This "Activate" line signals to the corresponding processor which proceeds to use the data bus while the other eleven processors are inhibited by their 'Activate' lines from preceeding to use it. In this way the highest numbered requesting processor is selected for activations on each occasion when the data bus becomes free.

Each processor 'uses' the data-bus for a variable integral number (typically 3 to 5) of $\frac{1}{8}$ microsecond periods, the duration of each user cycle being determined by signals from the main store, which indicate when the cycle is complete.

A 13 MHz crystal clock D in combination with an interface cycle control system E determines the times at which data bus actions can occur. It causes the states of the 'request' lines to be staticised during each 'cycle' of data bus use (or periodically until a Request is recognised), and also determines the times at which new settings of the 'Activate' lines are made.

The main store may embody ferrite core storage semiconductor random-access (read-write) and ROM (read only) storage in proportions to suit the application. Suitable components are the widely available 4096-bit, for example Mostek M.K 4096 or 16,384 bit dynamic RAM chips, for example Mostek MK 4116, Texas TMS 4116 or I.T.T's ITT 4116.

In the further store (Table number store) 23 of FIG. 2, two 74S 189 chips can be used to provide storage for up to sixteen entries of -six bits each. Widely available integrated circuits can be used to encode the 'processor identity' to a form suitable to address this store. In the table store 15, nine 93425A chips (static 1024 bit RAMS) can be used to give rapid access to the nine bit table-entry, where eight bits of the entry indicate the value of Z and the remaining bit operates a 'protect' line on the data-bus which is used in the main store and in the processors to limit the effects of program errors.

We claim:

1. A data processing system for expanding the address capability of individual microprocessors sharing a common store, which comprises:
   a plurality of processors each capable of internally generating a digital addressing word of A + B digits;
   a main store common to all of said processors and having a plurality of storage regions each containing a plurality of storage areas, each storage area being addressable by a digital addressing word of Z + B digits where Z is greater than A;
   a table store separate from said main store and common to all of said processors, said table store comprising a plurality of tables each providing a plurality of digital codewords of Z digits;

a shared data-bus connecting all of said microprocessors, said main store and said table store;

a control unit connected to said data-bus to control the data-bus for access by a selected processor to the table store and the main store and to address a particular table of said table store in accord with the selected processor, to pass the A digits of the addressing word of the selected processor to said particular table and thereby address a particular codeword of said particular table, and to pass the Z digits of said particular codeword, together with the B digits of said addressing word of the selected processor to address a particular storage area of said main store whereby to expand the address capability of the selected processor by the value $2^{(Z+B)} - 2^{(A+B)}$.

* * * * *